US012650682B2

(12) United States Patent
Stump et al.

(10) Patent No.: US 12,650,682 B2
(45) Date of Patent: Jun. 9, 2026

(54) INDUSTRIAL AUTOMATION PROJECT DESIGN TELEMETRY

(71) Applicant: Rockwell Automation Technologies, Inc., Mayfield Heights, OH (US)

(72) Inventors: Andrew R. Stump, Mentor, OH (US); Anthony Carrara, Strongsville, OH (US); Adam Gregory, Oak Creek, WI (US); Lorenzo Majewski, Milwaukee, WI (US); Fabio Malaspina, Twinsburg, OH (US); Eashwer Srinivasan, Fremont, OH (US); Srdjan Josipovic, Beachwood, OH (US); Omar A Bahader, Solon, OH (US); Jerome R Anderson, Mission Viejo, CA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 494 days.

(21) Appl. No.: 17/482,530

(22) Filed: Sep. 23, 2021

(65) Prior Publication Data
US 2023/0091963 A1 Mar. 23, 2023

(51) Int. Cl.
G05B 19/418 (2006.01)
G06F 8/34 (2018.01)
(Continued)

(52) U.S. Cl.
CPC ......... G05B 19/41835 (2013.01); G06F 8/34 (2013.01); G06F 8/35 (2013.01);
(Continued)

(58) Field of Classification Search
CPC .... G05B 19/41835; G05B 2219/31229; G05B 2219/31343; G06F 8/34–36
See application file for complete search history.

(56) References Cited

U.S. PATENT DOCUMENTS

| | | | |
|---|---|---|---|
| 12,020,056 B2 | 6/2024 | Como et al. | |
| 12,412,120 B2 * | 9/2025 | Cella | G06N 20/00 |

(Continued)

FOREIGN PATENT DOCUMENTS

| | | |
|---|---|---|
| BR | PI0900441 A2 | 12/2010 |
| CN | 107615199 A | 1/2018 |

(Continued)

OTHER PUBLICATIONS

Lee, Kyunghyun, and Taehyoun Kim. "UMIICA: A Model-Driven Integrated Development Environment for Industrial Control Applications." IEEE Access 6 (2018): 43290-43301. (Year: 2018).*

(Continued)

*Primary Examiner* — Bradley A Teets
*Assistant Examiner* — Joanne G Macasiano
(74) *Attorney, Agent, or Firm* — Amin, Turocy & Watson, LLP

(57) ABSTRACT

An industrial integrated development environment (IDE) includes analytic features that generate control project telemetry data based on analysis of a control system design and uses this project telemetry data as the basis for control system design guidance and recommendations. The IDE system can analyze the control system design and identify industrial devices use by the control project, device features that are utilized by the control project, resource utilizations, and other such project telemetry. The IDE system can generate recommendations for improving the control system design based on this project telemetry. The project telemetry data can also be provided to product vendors, offering insights into how the vendors' products are being used by end customers.

20 Claims, 15 Drawing Sheets

(51) Int. Cl.
  *G06F 8/35* (2018.01)
  *G06F 8/36* (2018.01)
(52) U.S. Cl.
  CPC ...... *G06F 8/36* (2013.01); *G05B 2219/31229* (2013.01); *G05B 2219/31343* (2013.01)

(56) References Cited

U.S. PATENT DOCUMENTS

| | | | | |
|---|---|---|---|---|
| 2014/0336791 | A1* | 11/2014 | Asenjo | G05B 13/026 |
| | | | | 700/44 |
| 2014/0337000 | A1* | 11/2014 | Asenjo | G06Q 10/06 |
| | | | | 703/13 |
| 2015/0019191 | A1* | 1/2015 | Maturana | G05B 19/0423 |
| | | | | 703/13 |
| 2015/0186118 | A1* | 7/2015 | Prosak | G05B 19/056 |
| | | | | 717/109 |
| 2016/0259313 | A1* | 9/2016 | Liu | G06F 3/0484 |
| 2016/0282854 | A1* | 9/2016 | Jauquet | G05B 19/042 |
| 2016/0283352 | A1* | 9/2016 | Kraus | H04L 41/40 |
| 2018/0101158 | A1 | 4/2018 | Guthrie et al. | |
| 2020/0103877 | A1* | 4/2020 | Truong | G05B 19/41865 |
| 2021/0096523 | A1 | 4/2021 | Stump et al. | |
| 2021/0096553 | A1 | 4/2021 | Stump et al. | |
| 2021/0103690 | A1 | 4/2021 | Stump et al. | |
| 2021/0191694 | A1* | 6/2021 | Maron | G06F 8/35 |
| 2021/0409521 | A1* | 12/2021 | Platenius-Mohr | H04L 69/08 |
| 2022/0221844 | A1* | 7/2022 | Amaro, Jr. | H04L 41/344 |
| 2022/0398355 | A1* | 12/2022 | Idota | G06F 30/17 |

FOREIGN PATENT DOCUMENTS

| | | |
|---|---|---|
| CN | 109684552 A | 4/2019 |
| CN | 111445034 A | 7/2020 |
| CN | 112558928 A | 3/2021 |
| CN | 112558929 A | 3/2021 |
| EP | 3 798 815 A1 | 3/2021 |
| EP | 4 120 067 A1 | 1/2023 |
| WO | 2021149116 A1 | 7/2021 |

OTHER PUBLICATIONS

Qamsane, Yassine, et al. "A methodology to develop and implement digital twin solutions for manufacturing systems." IEEE Access 9 (Mar. 2021): 44247-44265. (Year: 2021).*
Borangiu, Theodor, et al. "Digital transformation of manufacturing through cloud services and resource virtualization." Computers in Industry 108 (2019): 150-162. (Year: 2019).*
Rasheed, Adil, Omer San, and Trond Kvamsdal. "Digital twin: Values, challenges and enablers from a modeling perspective." IEEE access 8 (2020): 21980-22012. (Year: 2020).*
Tao, Fei, et al. "Digital twin in industry: State-of-the-art." IEEE Transactions on industrial informatics 15.4 (2018): 2405-2415. (Year: 2018).*
Extended European Search Report received for European Patent Application Serial No. 22195087.6, dated Feb. 15, 2023, 8 pages.
Communication pursuant to Article 94(3) EPC for European Application No. 22 195 087.6-1201, dated Oct. 2, 2024.
Office Action for Chinese Application No. 202210960939.7, dated Mar. 26, 2025.
Second Office Action received for Chinese Patent Application Serial No. 202210960939.7 dated Jul. 30, 2025, 61 pages(Including English Translation).
Communication Pursuant to Article 94(3) EPC received for EP Patent Application Serial No. 22195087.6 dated Feb. 4, 2026, 10 pages.

\* cited by examiner

Figure 3:
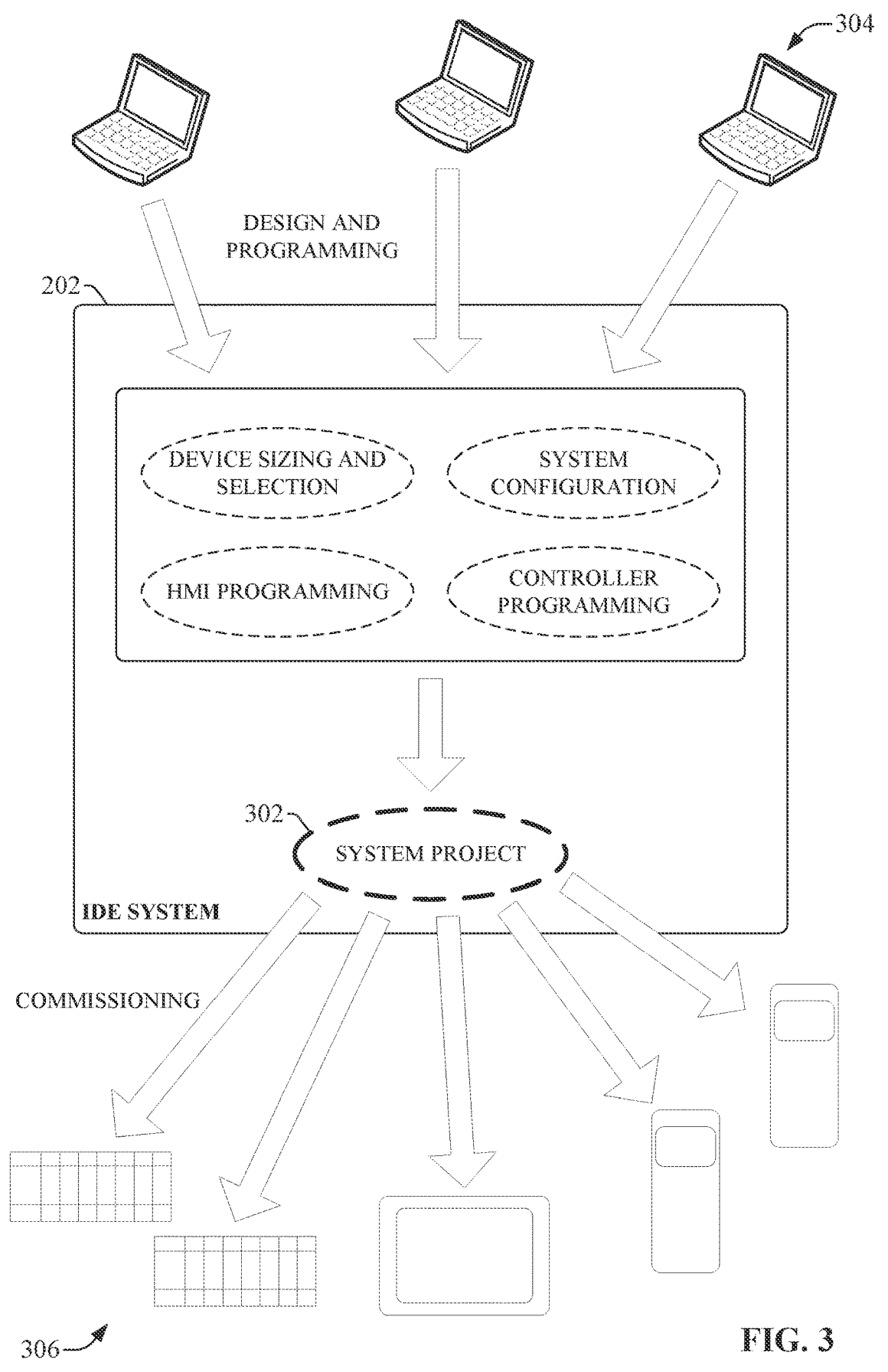

304

DESIGN AND
PROGRAMMING

202

DEVICE SIZING AND
SELECTION

SYSTEM
CONFIGURATION

HMI PROGRAMMING

CONTROLLER
PROGRAMMING

302

SYSTEM PROJECT

IDE SYSTEM

COMMISSIONING

IDE SYSTEM — 202

VENDOR REPOSITORY — 904

DEVICE PROFILES — 906

APPS. — 908

PROJECT TELEMETRY COMPONENT — 212

CONTROL PROJECT — 302

CONTROL CODE
DEVICE CONFIGURATIONS
VISUALIZATION
• • •

PROJECT TELEMETRY — 902

DEVICES IN USE
MODULES IN USE
I/O UTILIZATION
NETWORK UTILIZATION
DEVICE USAGE FREQUENCY
MEMORY UTILIZATION
• • •

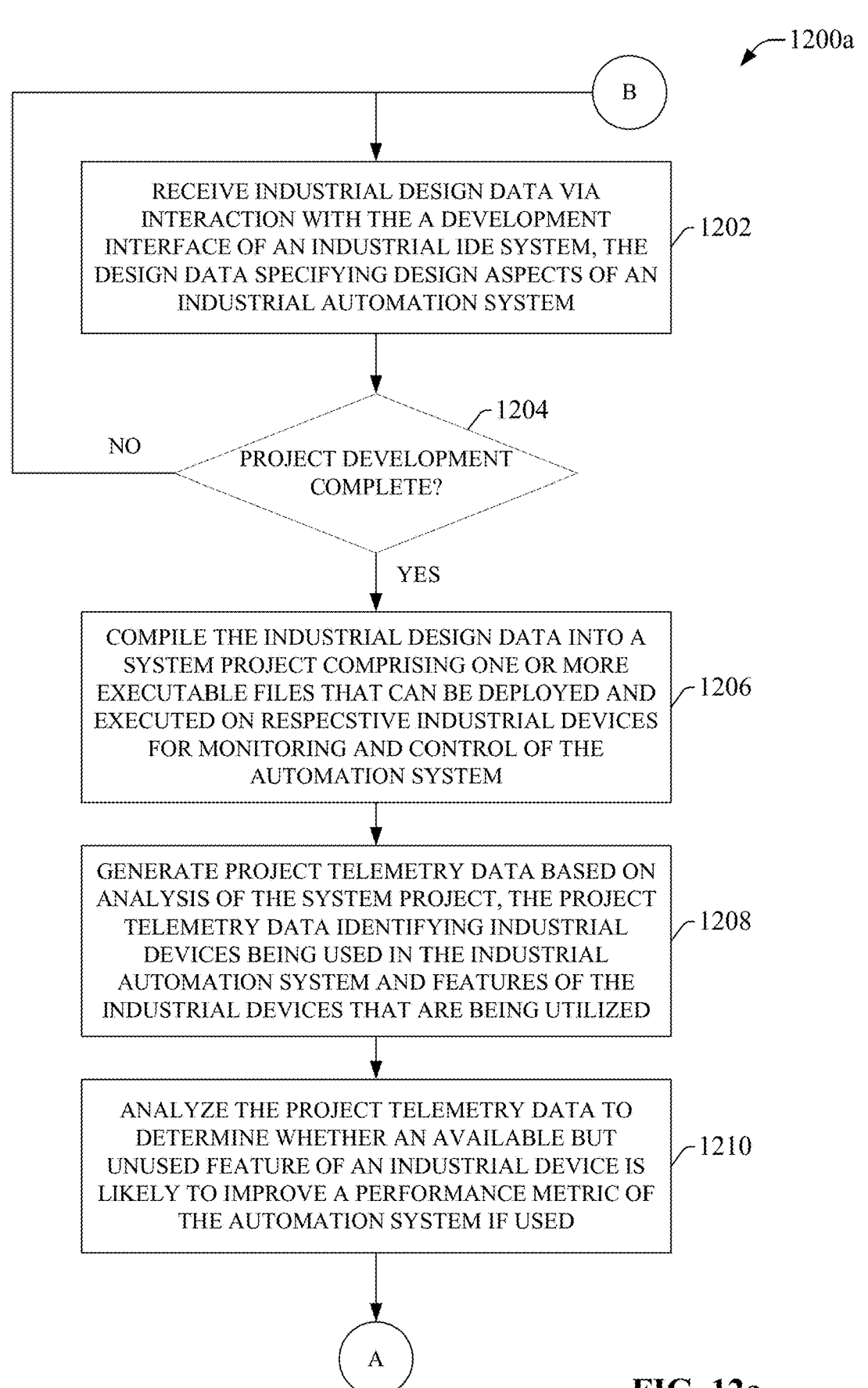

1200a

B

RECEIVE INDUSTRIAL DESIGN DATA VIA INTERACTION WITH THE A DEVELOPMENT INTERFACE OF AN INDUSTRIAL IDE SYSTEM, THE DESIGN DATA SPECIFYING DESIGN ASPECTS OF AN INDUSTRIAL AUTOMATION SYSTEM — 1202

1204

NO        PROJECT DEVELOPMENT COMPLETE?

YES

COMPILE THE INDUSTRIAL DESIGN DATA INTO A SYSTEM PROJECT COMPRISING ONE OR MORE EXECUTABLE FILES THAT CAN BE DEPLOYED AND EXECUTED ON RESPECSTIVE INDUSTRIAL DEVICES FOR MONITORING AND CONTROL OF THE AUTOMATION SYSTEM — 1206

GENERATE PROJECT TELEMETRY DATA BASED ON ANALYSIS OF THE SYSTEM PROJECT, THE PROJECT TELEMETRY DATA IDENTIFYING INDUSTRIAL DEVICES BEING USED IN THE INDUSTRIAL AUTOMATION SYSTEM AND FEATURES OF THE INDUSTRIAL DEVICES THAT ARE BEING UTILIZED — 1208

ANALYZE THE PROJECT TELEMETRY DATA TO DETERMINE WHETHER AN AVAILABLE BUT UNUSED FEATURE OF AN INDUSTRIAL DEVICE IS LIKELY TO IMPROVE A PERFORMANCE METRIC OF THE AUTOMATION SYSTEM IF USED — 1210

UNUSED FEATURE LIKELY TO IMPROVE THE PERFORMANCE METRIC? — 1212

NO → B

YES

GENERATE A RECOMMENDATION TO MODIFY THE SYSTEM PROJECT TO UTILIZE THE UNUSED FEATURE OF THE INDUSTRIAL DEVICE — 1214

INDUSTRIAL AUTOMATION PROJECT DESIGN TELEMETRY

BACKGROUND

The subject matter disclosed herein relates generally to industrial automation systems, and, for example, to industrial programming development platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for providing industrial control system design guidance is provided, comprising a user interface component configured to render integrated development environment (IDE) interfaces and to receive, via interaction with the IDE interfaces, design input that defines aspects of a control project for monitoring and controlling an industrial system; a project generation component configured to generate system project data based on the design input, the system project data comprising at least one of an executable industrial control program, an industrial visualization application, or industrial device configuration data; a project telemetry component configured to generate project telemetry data based on a first analysis of the system project data, the project telemetry data identifying industrial devices used by the control project, features of the industrial devices used by the control project, and unused available features of the industrial devices; and a project analysis component configured to generate a recommendation for modifying the control project based on a second analysis performed on the project telemetry data.

Also, one or more embodiments provide a method for providing industrial control system design guidance, comprising rendering, by a system comprising a processor, integrated development environment (IDE) interfaces on a client device; receiving, by the system via interaction with the IDE interfaces, industrial design input received from the client device that defines aspects of a control project for monitoring and controller an industrial system; generating, by the system, system project data based on the industrial design input, the system project data comprising at least one of an executable industrial control program, an industrial visualization application, or industrial device configuration data; generating, by the system, project telemetry data based on a first analysis of the system project data, the project telemetry data identifying industrial devices used by the control project, features of the industrial devices used by the control project, and unused available features of the industrial devices; and generating, by the system, a recommendation for modifying the control project based on a second analysis performed on the project telemetry data.

Also, according to one or more embodiments, a non-transitory computer-readable medium is provided having stored thereon instructions that, in response to execution, cause a system to perform operations, the operations comprising rendering integrated development environment (IDE) interfaces on a client device; receiving, via interaction with the IDE interfaces, industrial design input received from the client device that defines aspects of a control project for monitoring and controller an industrial system; generating system project data based on the industrial design input, the system project data comprising at least one of an executable industrial control program, an industrial visualization application, or industrial device configuration data; generating project telemetry data based on a first analysis of the system project data, the project telemetry data identifying industrial devices used by the control project, features of the industrial devices used by the control project, and unused available features of the industrial devices; and generating a recommendation for modifying the control project based on a second analysis performed on the project telemetry data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 3 is a diagram illustrating a generalized architecture of an industrial IDE system.

FIG. 12*a* is a flowchart of a first part of an example methodology for generating control design feedback based on analysis of an industrial control project.

DETAILED DESCRIPTION

Figure 1:
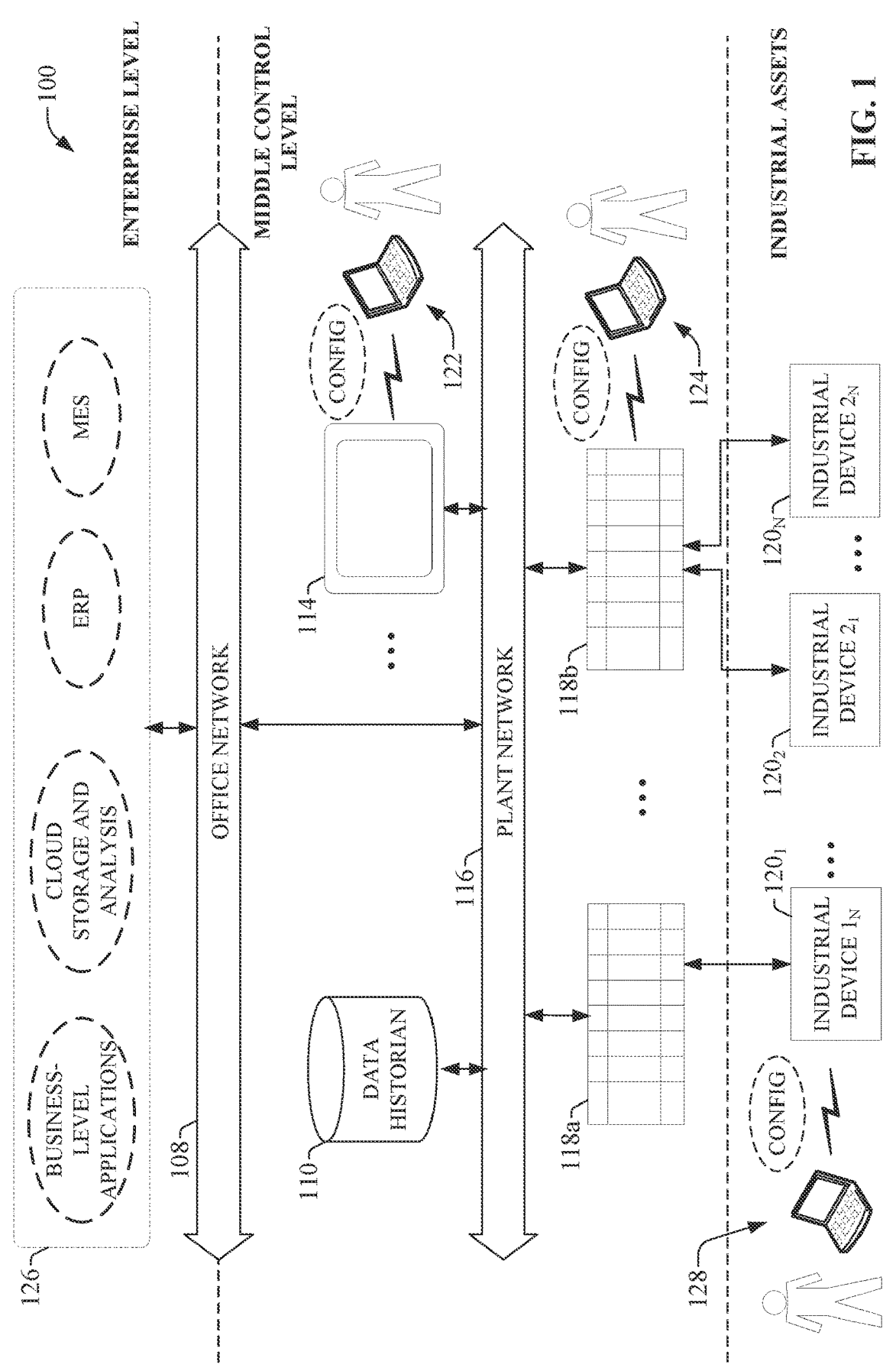
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these and other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

Also, some embodiments of the industrial IDE system can generate project telemetry data based on analysis of system projects developed by end customers. This project telemetry data can offer insights into both the system project as well as the equipment and device topology of the automation system that the control project is designed to monitor and control. The project telemetry data can also be used as the basis for design recommendations and augmented remote support. The IDE system can also generate aggregated project telemetry data based on analysis of system projects developed by multiple end customers and provide this data to equipment or software vendors. This aggregated project telemetry data can offer insights into how vendor's products are being used.

Figure 2:
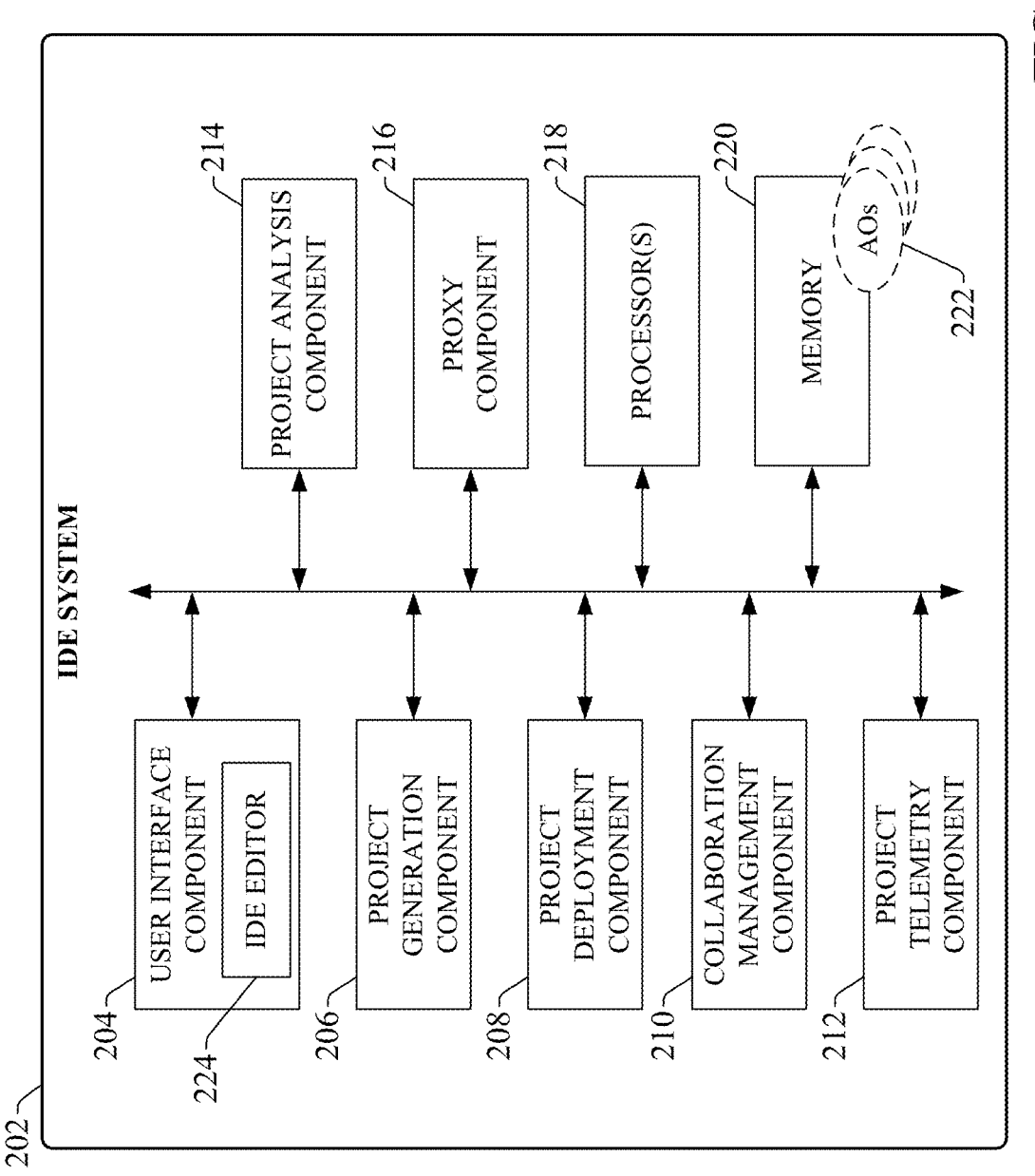
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a collaboration management component 210, a project telemetry component 212, a project analysis component 214, a proxy component 216, one or more processors 218, and memory 220. In various embodiments, one or more of the user interface component 204, project generation component 206, project deployment component 208, collaboration management component 210, project telemetry component 212, project analysis component 214, proxy component 216, the one or more processors 218, and memory 220 can be electrically and/or communicatively coupled to one another to perform one or more of the functions of the IDE system 202. In some embodiments, components 204, 206, 208, 210, 212, 214, and 216 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, or other such input. Output data rendered by various embodiments of user interface component 204 can include program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Collaboration management component 210 can be configured to initiate a communication channel to a live or automated expert who can provide design assistance, recommend improvements to a system project, or alert a developer of available device features that may improve performance of the system project.

Project telemetry component 212 can be configured to analyze an industrial control project submitted by a user and generate project telemetry, or statistical information, for the submitted project based on the analysis. Example project telemetry data that can be generated by the project telemetry component 212 can include, but is not limited to, an inventory of devices used in the project, information regarding how the devices are being used, reports indicating how close to hardware or software capacity limitations the devices or associated software will be operating, how much memory or energy is expected to be consumed by the project during runtime, or other such statistics.

Project analysis component 214 is configured to analyze the project telemetry data generated by the project telemetry component 212 and generate design recommendations or warnings based on this analysis. Project analysis component 214 can also generate device or equipment usage statistics inferred from multiple projects submitted by multiple end customers for use by equipment vendors or OEMs.

Proxy component 216 can be configured to manage connectivity and sharing of project information between developers and remote technical support.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency. Collaborative features supported by the industrial IDE system are described in more detail herein.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
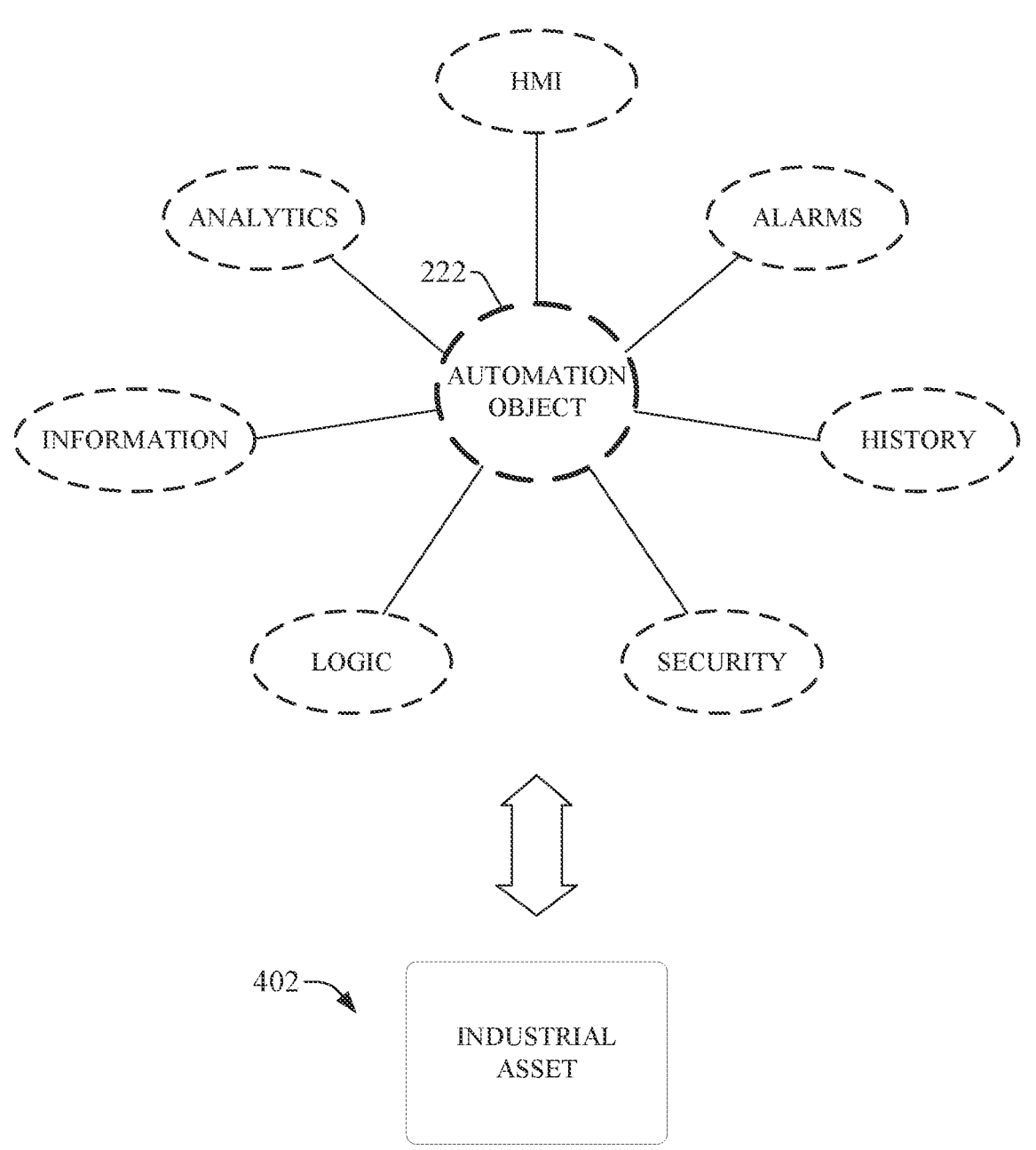
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402 and can be incorporated into a system project 302 as elements of control code, a 2D or 3D visualization, a knowledgebase or maintenance guidance system for the industrial assets, or other such aspects.

Figure 5:
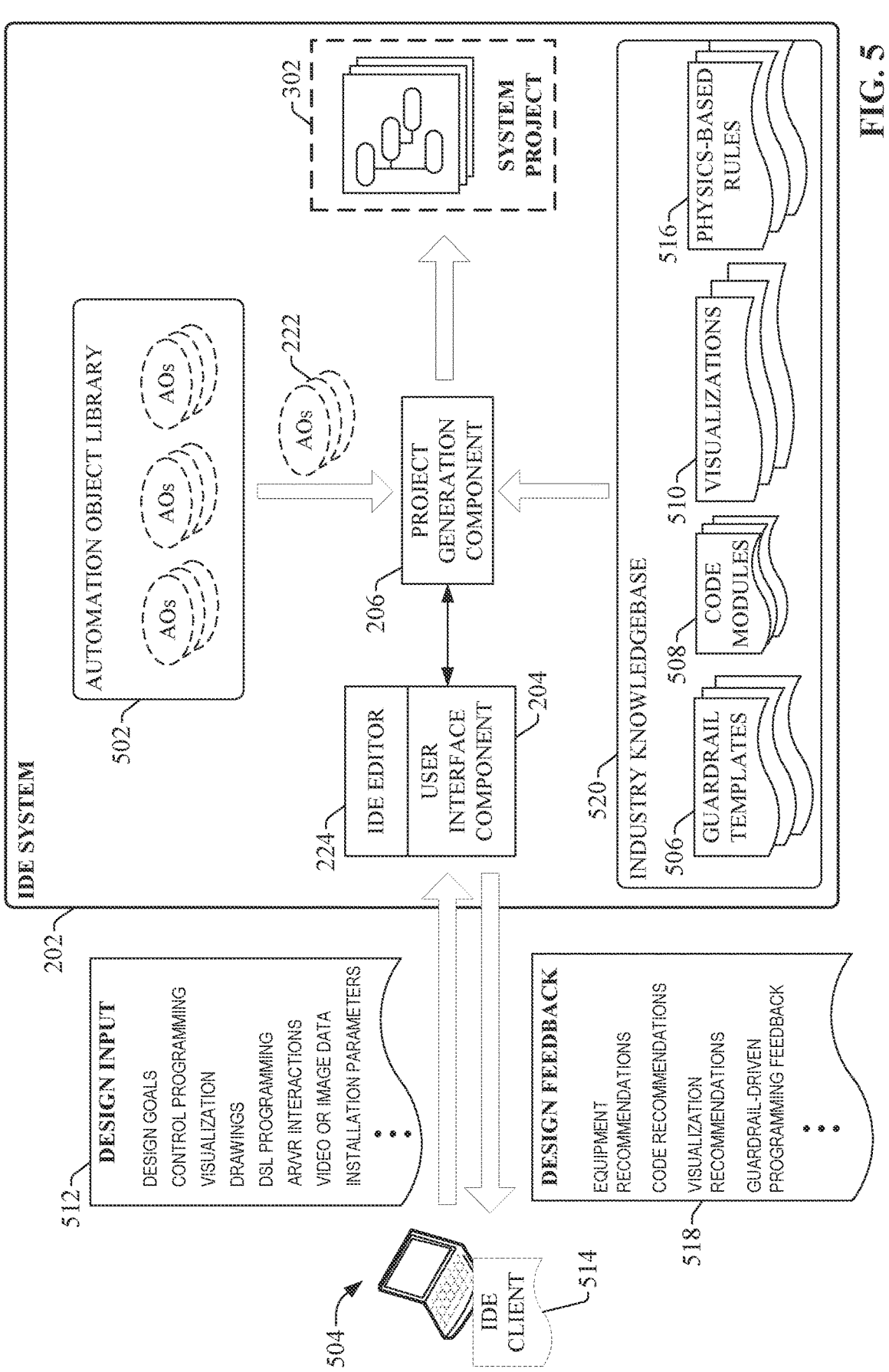
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase 502 (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether predefined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Figure 6:
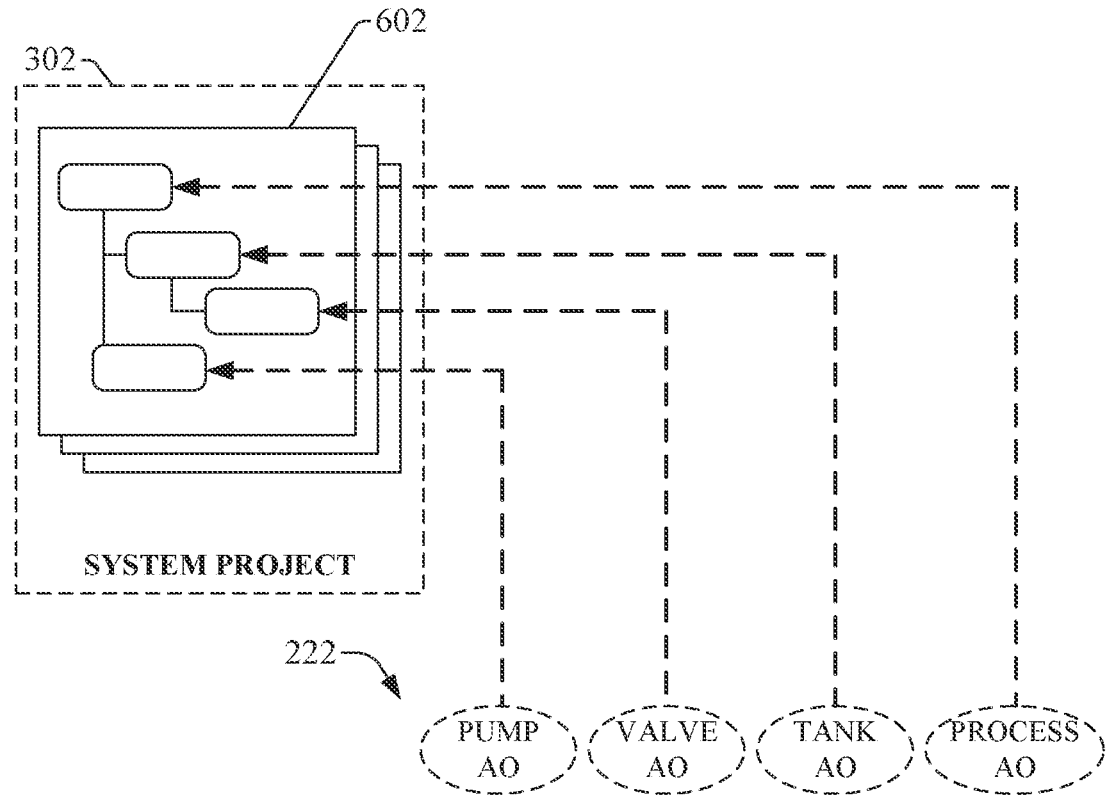
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
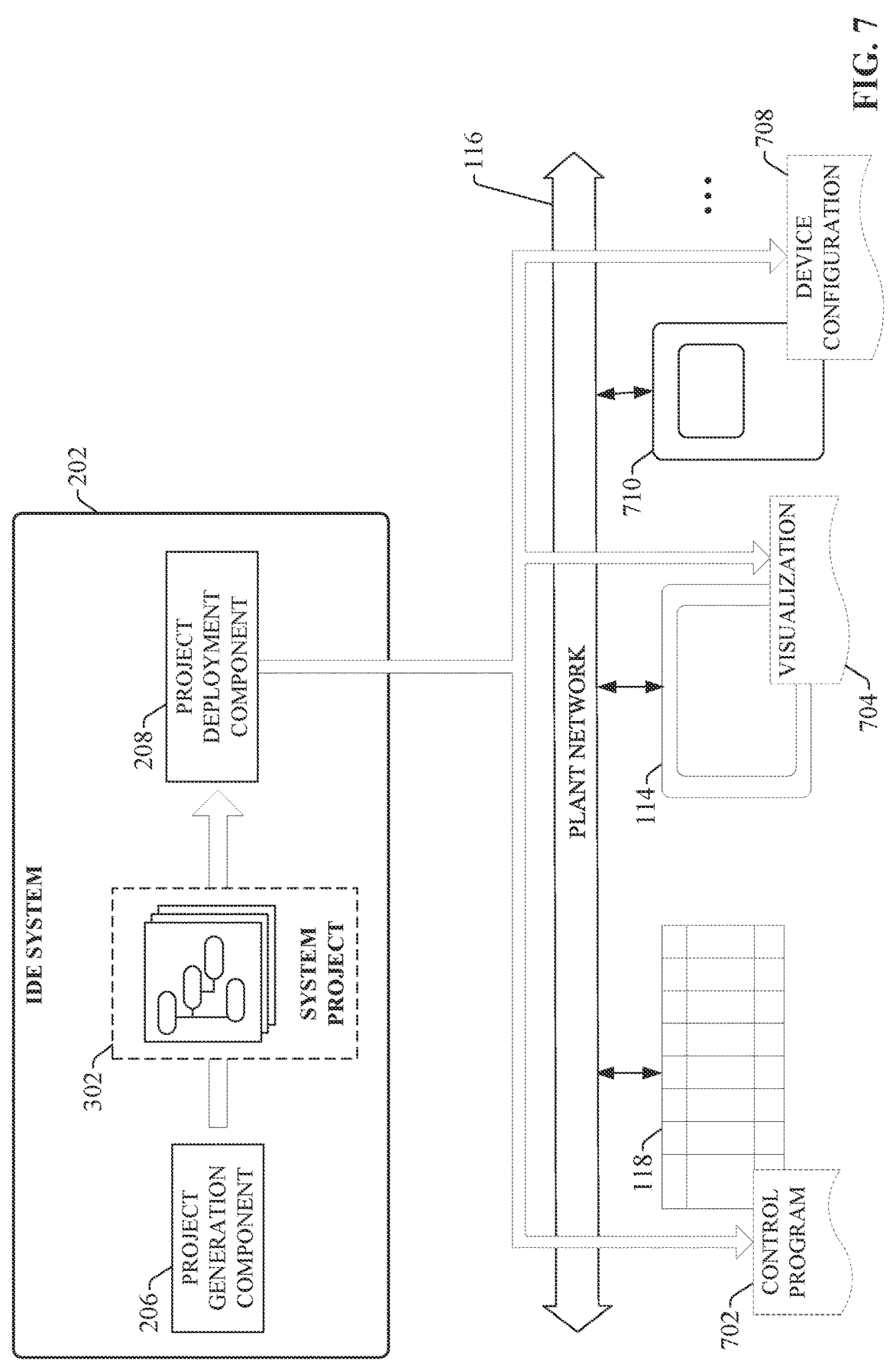
FIG. 7 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
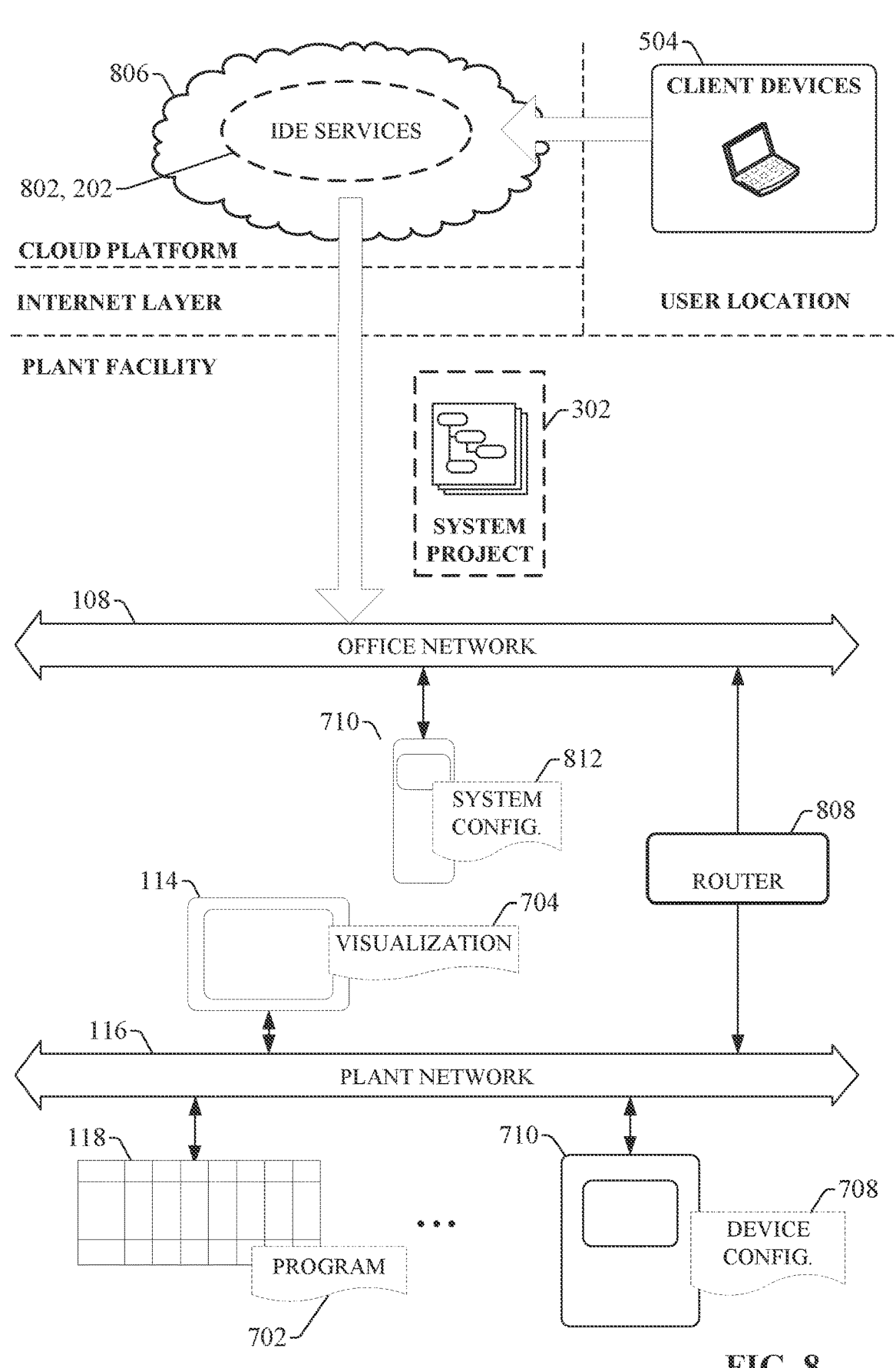
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Figure 9:
FIG. 9 is a diagram illustrating extraction of project telemetry data from a control project developed using a IDE system.

Some embodiments of the IDE system 202 can include project analysis features that can be applied to completed control projects 302 for the purposes of generating project recommendations intended to optimize the control design, or to guide the designer to previously unknown and unused device features that, if utilized, may improve performance of the control project. To facilitate intelligent analysis of a completed system project 302, some embodiments of the IDE system 202 can include a project telemetry component 212 that generates project telemetry data for a submitted system project 302. This project telemetry data can offer insights into both the control project itself as well as the equipment and device topology of the automation system for which the system project 302 is being designed. FIG. 9 is a diagram illustrating extraction of project telemetry data 902 from a system project 302 developed using the IDE system 202. Based on analysis of the system project 302, project telemetry component 212 can determine or infer characteristics of the system project 302 itself, information regarding the devices or equipment that makes up automation system to be monitored and controlled by the control projects 302, predictions regarding performance or resource utilization of the controlled system, the control design's estimated impacts on device lifecycle for one or more devices, or other such project metrics.

For example, based on analysis of an industrial controller program file—which may include control code, I/O configuration data, and networking configuration data for an industrial controller on which the program file will be executed— the project telemetry component 212 may identify input or output devices connected to the industrial controller (e.g., based on examination of the I/O configuration or the control code itself), and record an inventory of these devices in the project telemetry data 902. Similar analysis can be used to determine I/O or control modules configured for use, as well as information regarding how the controller's I/O is being utilized. Project telemetry component 212 can also record inferred functional or topological relationships between any two or more of the devices or equipment identified as being part of the automation system. Project telemetry component 212 can also estimate a total amount of network bandwidth or energy that the automation system is expected to consume. To yield further insights into how the devices that make up the control system are being used, project telemetry data 902 can also record which subset of the available features of a device are currently being used by the system project 302.

In addition to metrics for the automation system to be controlled, the project telemetry component 212 can also estimate performance metrics for the control code itself, such as an estimated amount of memory or processing power required to execute aspects of the system project 302.

In some cases, project telemetry component 212 can enhance the project telemetry data 902 generated for the system project 302 by referencing vendor-specific device information stored in device profiles 906 on a vendor repository 904. For example, the project telemetry component 212 may identify, based on analysis of the system project 302, that a particular device model (e.g., an I/O module, a network infrastructure device, a motor drive, a servo, an actuator, etc.) is being used as a component of the automation system. Based on identification of this device, project telemetry component 212 can access the vendor repository 904 corresponding to the vendor of the device, determine whether a device profile 906 is available for the device, and, if so, retrieve functional specification data for the device from the device profile 906 for inclusion in the project telemetry data 902. This functional specification data, which depends on the type of device, can include such information as the device's available I/O, available configuration parameters or functionalities, available memory or processing capacity, lifecycle information, response times, physical dimensions, rated power, networking capabilities, operational limitations (e.g., environmental requirements, such as ambient temperatures for which the device is rated), or other such supplemental device information.

Figure 10:
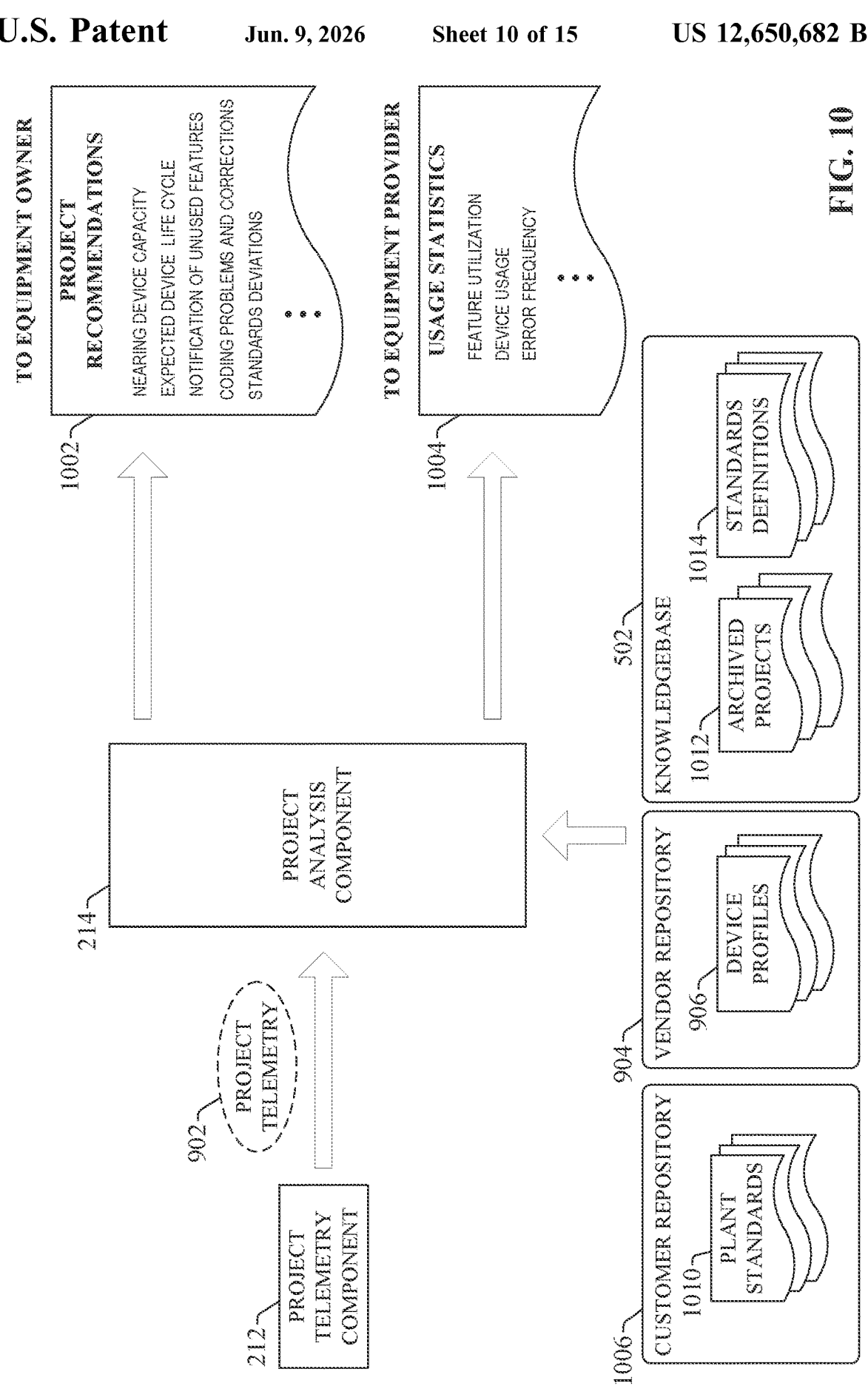
FIG. 10 is a diagram illustrating generation of project recommendations based on analysis of extracted project telemetry data.

Once project telemetry data 902 has been extracted for the system project 302, the project analysis component 214 can generate recommendations or notifications relevant to the project design based on analysis of this project telemetry data 902 as well as encoded industry expertise. FIG. 10 is a diagram illustrating generation of project recommendations 1002 based on analysis of the extracted project telemetry data 902. By analyzing project telemetry data 902, project analysis component 214 can ascertain how the customer's industrial hardware and software assets are being used and generate recommendations or notifications based on this assessment. This can include determining whether the proposed system project 302—either due to control sequences defined by the control programming or the configuration parameters set for one or more industrial devices—will cause hardware or software used in the control project to operate near or above their rated operating thresholds. For example, based on the control project's I/O utilization, as recorded in the project telemetry data 902, as well as knowledge of the I/O capacity of devices used in the control project (which may be determined based on specification data for those devices as record in device profiles 906), project analysis component 214 may generate a notification that the proposed control design will cause one or more control devices (e.g., industrial controllers or I/O modules) to near or exceed its maximum I/O capacity. Based on this assessment, the project analysis component 214 may further recommend an alternative control device having a higher I/O capacity than that currently proposed in the control project in order to increase the number of spare I/O points for future expansion.

Project analysis component 214 may also estimate a degree of device utilization over time based on analysis of the project telemetry data 902 and cross-reference this information with lifecycle information for the device recorded in the device's profile 906, and generate a notification indicating an expected life cycle or time-to-failure for the device if used as proposed in the control project. If an equivalent device having a longer expected lifecycle is available, project analysis component 214 may also generate a recommendation to replace the currently proposed device with the equivalent. Alternatively, the project analysis component 214 may recommend a modification to the control project that may extend the lifespan of the device (e.g., by reducing the operating frequency of the device without otherwise impacting the control outcomes).

In some embodiments, project analysis component 214 may also identify unused features of a device which, if utilized, may improve one or more operating metrics of the control project. These may be features of the device (e.g., configuration parameters, latent functions that are inactive by default but can be activated or invoked, etc.) that are available but are unknown to the program developer. In an example scenario, project analysis component 214 may discover available features of a device based on the functional specifications recorded in the device's profile 906, and determine whether any unused features may be relevant to an aspect of the system project 302, or may improve a performance metric for the system project 302. For example, the project analysis component 214 may determine that invoking a currently unused operating mode of a device may reduce the memory footprint or network bandwidth usage of the device, may improve the automation system's product throughput, may reduce energy or material consumption of the project as a whole, may reduce product waste, or may unlock another unforeseen improvement in the project's operation. If such possible design improvements are identified, user interface component 204 can send a notification to the designer (or another user entity associated with the customer) recommending the design modification. In an example scenario, based on device configuration files included as part of system project 302, project analysis component 214 may determine that an unused feature of a drive (e.g., regenerative braking) may reduce overall power consumption, and generate a notification identifying the drive and indicating the unused feature. The notification may also offer a recommendation regarding when, during the control sequence, the feature should be invoked in order to obtain the predicted benefit.

Project analysis component 214 may also determine whether any aspect of the system project 302 deviates from industry or plant standards. This can be based on a comparison between the project telemetry data 902 and industry standards recorded in standards definitions 1014 (which may be stored in knowledgebase 502) or in-house standards recorded in the plant standards 1010 stored in a customer repository 1006. In the case of industry standards, the particular set of standards against which the system project 302 is compared may be a function of the industrial vertical (e.g., automotive, pharmaceutical, food and drug, oil and gas, etc.) in which the system project 302 will operate, since some types of industries may require adherence to a vertical-specific set of control standards or requirements. Accordingly, the knowledgebase 502 may classify standards definitions 1014 according to industrial vertical, allowing project analysis component 214 to select an appropriate set of standards to be applied to the system project 302. Standards definitions 1014 may define such industry standards as a required amount of unused I/O that must be reserved as spare capacity, an emissions or energy consumption requirement, a safety integrity level (SIL) requirement, interlocks or permissives that should be associated with a given type of control operation (e.g., tying a "valve open" command to the fill level of a tank, preventing a machine start command until specified safety interlocks are satisfied) or other such standards.

Example in-house standards that can be recorded in the customer's plant standards 1010 and applied to the system project 302 can include, but are not limited to, control coding standards, preferred vendors whose devices are approved for use within the plant, safety interlocks or permissives to be associated with certain control functions, or other such standards.

Project analysis component 214 may also perform any of the project analytics, and generate any of the design feedback 518, described above as being carried out by the project generation component 206. Some project analysis results may also trigger expert support review, such that the project analysis component 214 initiates remote review of the project, contingent on the designer's permission, by a technical support entity (as discussed in more detail in connection with FIG. 11 below).

Since the control project analysis carried out by the project telemetry component 212 and project analysis component 214 can identify or infer devices and networks that will be used by the system project 302, project analysis component 214 can also generate an inventory of the devices or industrial assets used by the customer's project 302. IDE system 202 can store this asset inventory in the customer repository 1006 associated with the owner of the system project 302. Moreover, if any of the discovered devices or industrial assets have associated digital device profiles 906 made available by the vendors of the assets and stored on the vendor repository 904, IDE system 202 can retrieve these device profiles 906 from the vendor repository 904 and store the profiles 906 in the customer repository 1006 as asset models corresponding to the devices. In this regard, the device profiles 906 may represent generic digital representations of their represented assets, and the project analysis component 214 may convert these generic device profiles 906 to customized asset models representing the customer's uniquely configured assets based on the project telemetry data 902. A device profile 906 for a given industrial device (e.g., an industrial controller, a motor drive, a safety device, etc.) can be customized, for example, by applying the designer's particular configuration parameters for that device (as obtained from the project telemetry data 902) to the device profile 906 to yield the customized asset model for the device. These asset models can be used as the basis for a digital twin of the automation system, which can be used to simulate and test the system project 302.

Results of the analysis performed on the project telemetry data 902 can also be formatted and filtered for use by equipment providers (e.g., equipment vendors, OEMs, etc.)

who participate in the ecosystem made possible by cloud-based versions of the IDE system 202, and this information can be made available to equipment providers as equipment usage statistics 1004. For example, for every equipment vendor whose equipment is being used in the system project 302, the project analysis component 214 can provide data to the vendor reporting which of their devices are being used, how many of each device is being used (e.g., how many of the vendor's controllers are in service at a customer's facility), and which features of those devices are being utilized as determined based on the analysis of the system project 302. This data can be provided to the vendor in a manner that anonymizes the end customer and prevents the vendor from being able to view the customer's proprietary information (e.g., recipe data, production statistics, etc.). In general, the IDE system 202 protects a customer's proprietary data while affording enough access to provide the services. The user interface component 204 can allow the user to easily control how proprietary data is exposed to or hidden from outside entities who are also participating in the IDE platform.

For a given equipment provider, the user interface component 204 can compile these device or equipment statistics from multiple control projects 302 submitted by multiple different customers and present this aggregated equipment usage and feature utilization information in any suitable presentation format. For example, information regarding which of the equipment provider's devices or assets are being used can be presented as numbers of each asset in use at customer sites, geographic breakdowns indicating where the assets are being used, charts indicating relative popularities of the vendor's product line, etc. Similar presentations can be used to convey which features (e.g., operating modes, configuration parameters, etc.) of each of the vendor's products are being used, or how closely their products are being utilized to their functional capacities (e.g., what percentage of a controller's available memory is being utilized), as determined from aggregated project telemetry data 902 collected from multiple end customers using the vendor's products. Equipment providers can use these statistics 1004 to make decisions regarding whether to discontinue a product due to lack of popularity; to identify potentially useful product features that are being underutilized by their customers and therefore should be more heavily promoted; to decide whether to increase or decrease memory, processing, or I/O resources of certain products based on a degree to which these resources are being used by the customers; or to make other informed decisions regarding product design and promotion.

While some equipment usage statistics 1004 may be presented to the equipment providers in a manner that anonymizes the end customers (e.g., for the purposes of global product usage analysis), selected other such statistics 1004 may be presented on a per-customer basis based on service or licensing agreements between the equipment provider and their customer. For example, some equipment providers, such as OEMs, may offer the use of their equipment as a subscription service in which the customer purchases a license for a specified degree of usage of the equipment (e.g., a specified number of operating cycles per month, a limited subset of available equipment features, etc.). In such scenarios, project analysis component 214 may determine an estimated frequency of usage of the provider's equipment based on analysis of the project telemetry data 902, and make this information available to the equipment provider (as usage statistics 1004) for the purposes of license enforcement.

Individualized usage statistics 1004 generated for a specific customer (e.g., an industrial enterprise that purchases devices and equipment from a vendor) can also be provided to and used by a vendor or other support entity to augment support provided to the customer by the vendor. In an example scenario, the vendor may enter a customer identifier for a customer of interest into the IDE system 202 in order to access and review the identified customer's usage statistics 1004, which inform the vendor as to which of the vendor's products are being used by the customer, how these products have been configured, which product features are being used and which are not currently being utilized, a percentage of each product's resources that are currently being consumed (e.g., memory, processing capacity, I/O capacity, etc.), and other such usage behavior. The vendor can use this information as the basis for proactive recommendations, technical support, and feature guidance.

For example, based on a customer's usage statistics 1004—generated based on telemetry data 902 obtained from a customer's project 302—the vendor may determine that the customer is not using a feature available on one of the vendor's products that, if utilized, could improve performance or reduce a frequency of errors currently being experienced on the customer's control system. The vendor could then arrange a consultation with the customer to explain the available feature and recommend modifications to the device configuration that unlock and configure the feature as appropriate given the customer's control application. In another example, the customer's usage statistics 1004 may indicate to the vendor that one of the control devices used by the customer is nearing a maximum memory usage, processing capacity, or I/O capacity, and based on this knowledge the vendor may notify the customer that a similar product with a higher available capacity is available.

Also, in some embodiments the project analysis component 214 can bundle usage statistics 1004 derived from the project telemetry data 902—which provides information regarding how the customer is using the industrial assets that make up their industrial automation systems—with information regarding frequency of errors being experienced by the automation systems. This can assist vendors or other technical support personnel to identify correlations between the customer's design choices or asset utilization and the frequency of errors experienced by the industrial control system that executes the system project 302. For example, it may be determined that the customer's usage of a particular set of device functions—as ascertained form the usage statistics 1004—is likely to be associated with an excessive frequency of machine downtime occurrences.

According to another type of analysis that can be applied to the project telemetry data 902, project analysis component 214 can compare the system project 302 or its extracted project telemetry data 902 with similar archived projects 1012 submitted by other end customers, and identify aspects of the submitted system project 302 that deviate significantly from corresponding aspects of the similar archived projects 1012. User interface component 204 can then render, as a project recommendation 1002, a notification indicating the deviant aspects of the system project 302 and recommending a project modification that would bring the system project 302 in line with common practice. In this way, the IDE system 202 can leverage collective industry expertise or common practice to provide recommendations regarding best practices relative to a submitted control project. Aspects of the submitted system project 302 that can be compared in this manner can include, but are not limited to, interlock designs for a given type of control operation, device configuration parameters (e.g., motor drive settings, network infrastructure device settings, safety device settings, etc.), control setpoints, orders of operations or timings for a given type of control operation or sequence, best control programming practices for various types of control operations, or other such project aspects.

Results of this deviation analysis can also be provided to vendors of control equipment as part of usage statistics 1004. In this way, vendors can be notified of customers who are using their equipment in non-standard ways to carry out a given industrial control application, affording the vendors an opportunity to proactively consult with those customers to recommend control design changes that will bring their designs in line with standard practice. In some embodiments, the IDE system 202 can also bundle error frequency statistics for the customer's automation system with the results of the deviation analysis, providing vendors useful information for ascertaining whether the system design deviations are likely to be a cause of excessive frequencies of operational errors relative to other customers who operate similar industrial applications.

Figure 11:
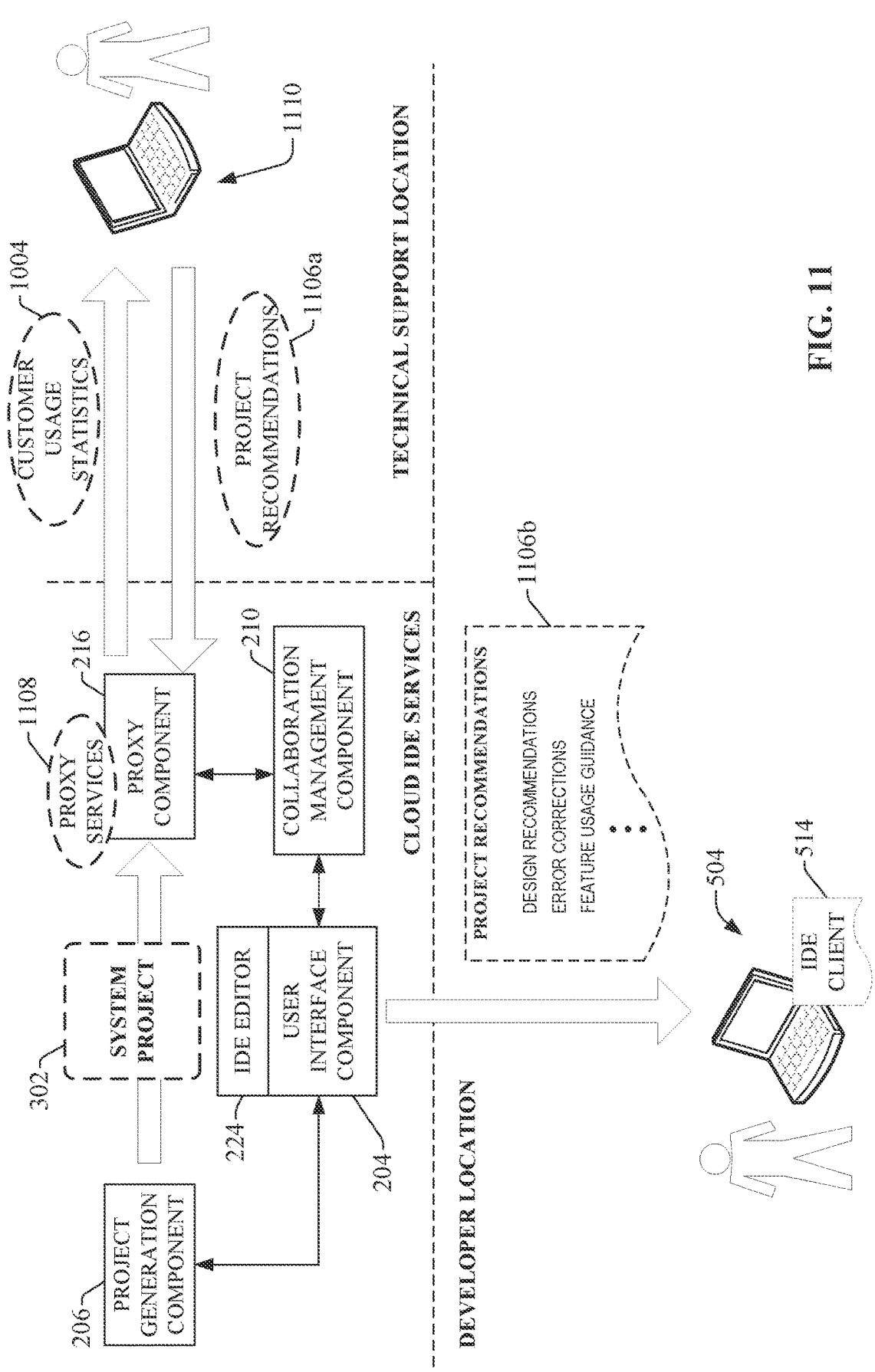
FIG. 11 is a diagram illustrating the use of IDE services as a proxy between a plant-based project developer and remote technical support personnel.

Information about a given customer's project design as encoded by telemetry-based usage statistics 1004 can also be leveraged by remote support personnel in connection with offering design recommendations, error corrections, and feature guidance. FIG. 11 is a diagram illustrating the use of IDE services as a proxy between a plant-based project developer and remote technical support personnel. In this embodiment, industrial IDE services 802 (a cloud-based embodiments of IDE system 202) include associated proxy services 1108 (implemented by proxy component 216) that manage connectivity and data exchange between a developer's client device 504 and remote technical support. In cloud-based implementations, each end user's system project 302 (e.g., a completed system project 302 for an automation system currently in operation or a pending system project 302 in development for an automation system to be commissioned) is securely maintained on the cloud platform. Proxy services 1108 can permit authorized technical support personnel (associated with client device 1110) to access some or all of a given customer's usage project statistics 1004 using the IDE services 802 to proxy into the customer's data. The technical support entity may be, for example, an administrator of the IDE services 802, an OEM who manufactures a machine for which control programming is being developed, a system integrator, an equipment vendor, or another such entity. In some embodiments, the end user can selectively permit access to a selected subset of their usage statistics 1004 data, while prohibiting access to other portions of their usage statistics or system project 302 from the technical support personnel, thereby protecting sensitive or proprietary project information.

Under certain scenarios, the collaboration management component 210 can initiate—via proxy component 216—a communication channel to a live or automated expert who can provide design assistance, recommend improvements to the system project 302, or alert the developer of available but currently unused features that may improve performance of the system project 302 and its associated automation system. In some embodiments, the IDE system 202 can establish connectivity with the expert automatically in response to an inference that the developer is experiencing difficulty in developing a portion of the system project 302 relating to the design goal. Alternatively, the IDE development interface can include controls that allow the end user to submit an assistance request that initiates collaboration with the expert. The assistance request may specify a particular aspect of the system project 302 for which assistance is required (e.g., a control code routine, a visualization screen, device selection or compatibility, configuration of a specified industrial device, etc.). In some embodiments, proxy component 216 may perform additional processing on the assistance request prior to sending a request to a remote support representative. Proxy component 216 can perform this additional processing based in part on previously captured knowledge of the end user's automation system in development, or the customer's larger plant facility. For example, proxy component 216 can glean additional customer-specific context that may assist in solving the design problem for which assistance is being requested. Such context may include additional information about the devices and/or machines that make up the automation system for which the system project 302 is being developed (e.g., identities of such devices, as well as their role in the overall industrial system and their functional relationships to one another), other upstream or downstream processes relative to the automation system being designed, whose operations may have an impact on operation of the new automation system, etc. In response to receipt of the assistance request, proxy component 216 can select an available technical support person determined to be qualified to assist with the request—e.g., based on information stored in competency profiles for respective technical support people indicating each person's level of training, areas of expertise, equipment for which the person has experience, etc.—and open a remote communication channel to the selected technical support person.

Once this communication channel is established, the technical support person can access, view, and modify selected subsets of the customer's system project 302, as well as the usage statistics 1004 generated for the project 302 by the project analysis component 214 (based on the project telemetry data 902 extracted from the project by the project telemetry component 212). Based on a review of these usage statistics 1004, the technical support person can submit project recommendations 1106, either in the form of direct modifications to aspects of the end user's system project 302 (e.g., control code rewrites, setting of device configurations, etc.) or design feedback submitted to the end user recommending certain design modifications, error corrections, guidance regarding available but unused device features, or providing other design guidance. In some embodiments, the cloud-based IDE system 202 can also serve as a trusted proxy through which technical support personnel can remotely access equipment at the end user's plant facility; e.g., for the purposes of remotely configuring the user's devices, viewing or modifying control programming on an industrial controller or visualization screens on an HMI terminal, etc.

By extracting and analyzing project telemetry for a customer's control system project 302—including assessing the devices or assets being used in the control project, the feature and capacity utilization of those devices, and other such aspects of the customer's control system design—and generating design recommendations and guidance based on this analysis, the IDE system 202 described herein can implement a design feedback loop that assists control system designers to refine and optimize their control projects based on encoded industry expertise, comparison with peer projects, and knowledge of industrial device specifications and features.

Figure 12B:
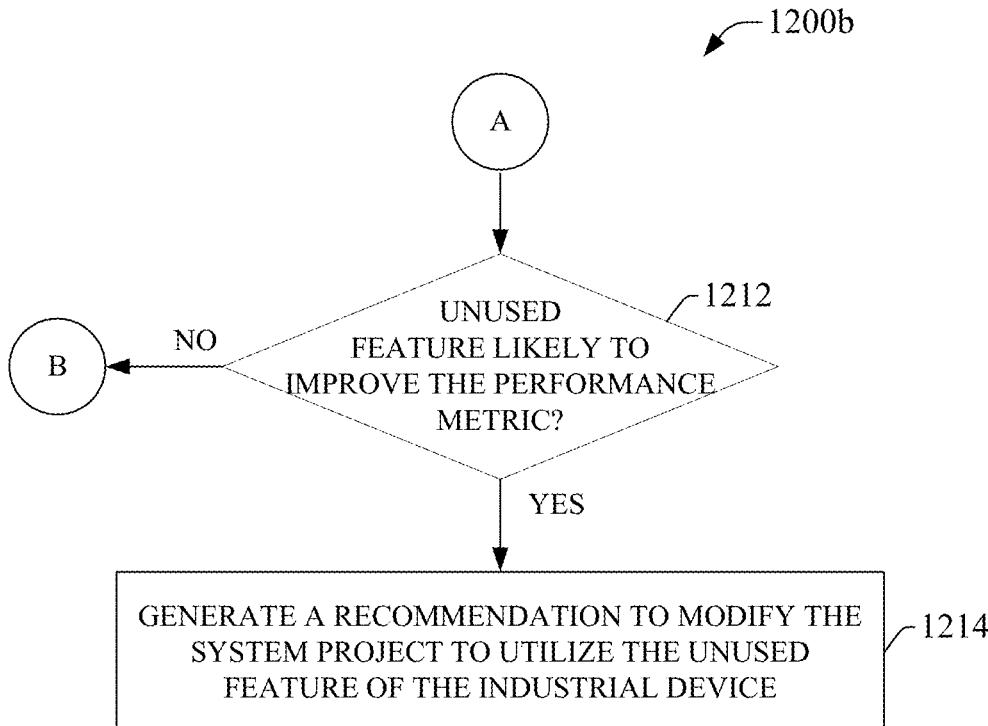
FIG. 12*b* is a flowchart of a second part of the example methodology for generating control design feedback based on analysis of an industrial control project.

FIGS. 12a-12b illustrate a methodology in accordance with one or more embodiments of the subject application.

While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12a illustrates a first part of an example methodology 1200a for generating control design feedback based on analysis of an industrial control project. Initially at 1202, industrial design data is received via interaction with an industrial IDE system, where the design data specifies design aspects of an industrial automation system being installed or updated. The industrial design data can be submitted in the form of one or more of industrial controller programming (e.g., ladder logic, sequential function charts, scripted control code such as an industrial DSL, etc.), HMI screen development input, industrial device or equipment selections, engineering drawing input, etc. In some embodiments, the industrial design data can also include completed engineering drawings (e.g., P&ID drawings, electrical drawings, mechanical drawings, etc.), which can be parsed and analyzed by the industrial IDE to identify components of the industrial automation system being designed (e.g., industrial devices, machines, equipment, conduit, piping, etc.) as well as functional and physical relationships between these components.

At 1204, a determination is made as to whether project development is complete. This determination may be made, for example, in response to an indication from the developer that the automation system project is ready to be parsed and compiled. If development is not complete (NO at step 1204) the methodology returns to step 1202. Steps 1202 and 1204 are repeated until development is complete (YES at step 1204), at which time the methodology proceeds to step 1206.

At 1206, the industrial design data received at step 1202 is compiled into a system project comprising one or more executable files that can be deployed and executed on respective industrial devices to facilitate monitoring and control of the industrial automation system for which the project was developed. The target industrial devices to which the executable files can be deployed can include, for example, industrial control devices (e.g., a PLC or another type of industrial control device), human-machine interface terminals, motor drives, or other types of devices.

At 1208, project telemetry data is generated based on analysis of the control system project. The project telemetry data identifies at least industrial devices being used in the automation system for which the system project is designed as well as features of the industrial devices that are being utilized by the control design.

At 1210, the project telemetry data generated at step 1208 is analyzed to determine whether an available but unused feature of one of the industrial devices is likely to improve a performance metric of the automation system if the feature were to be utilized. The device's available features can be ascertained by the IDE system based on access to specification data for the industrial device, which may be stored in a cloud-based vendor repository associated with a vendor of the device. The determination of whether utilization of the unused feature is likely to improve the performance metric can be based on a determination of the type of industrial application that is being carried out by the automation system, encoded expertise regarding the industrial application and how the device's unused feature can be used within the context of the application, comparison of the system project with other system projects that carry out similar industrial applications using the device's feature, or other such considerations.

The methodology then proceeds to the second part 1200b illustrated in FIG. 12b. At 1212, if the unused feature is determined to be likely to improve the performance metric, the methodology proceeds to step 1214, where a recommendation to modify the system project to utilize the unused feature of the industrial device is generated. This recommendation can be rendered on the development interface of the IDE system, affording the developer the opportunity to implement the proposed modification by submitting further design input via the interface. If no unused features are identified that could improve the performance metric, the methodology returns to step 1202.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 13:
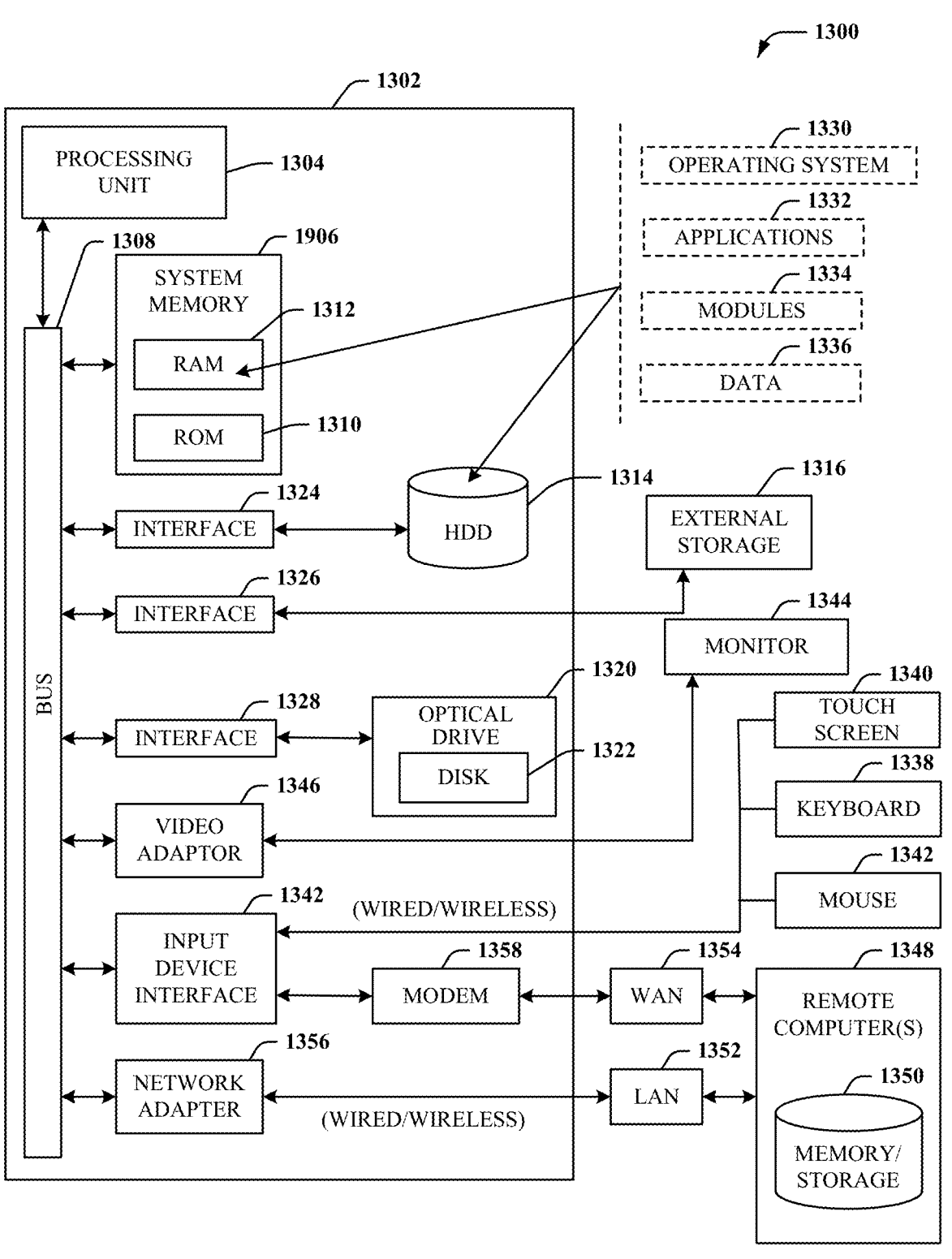
FIG. 13 is an example computing environment.
Figure 14:
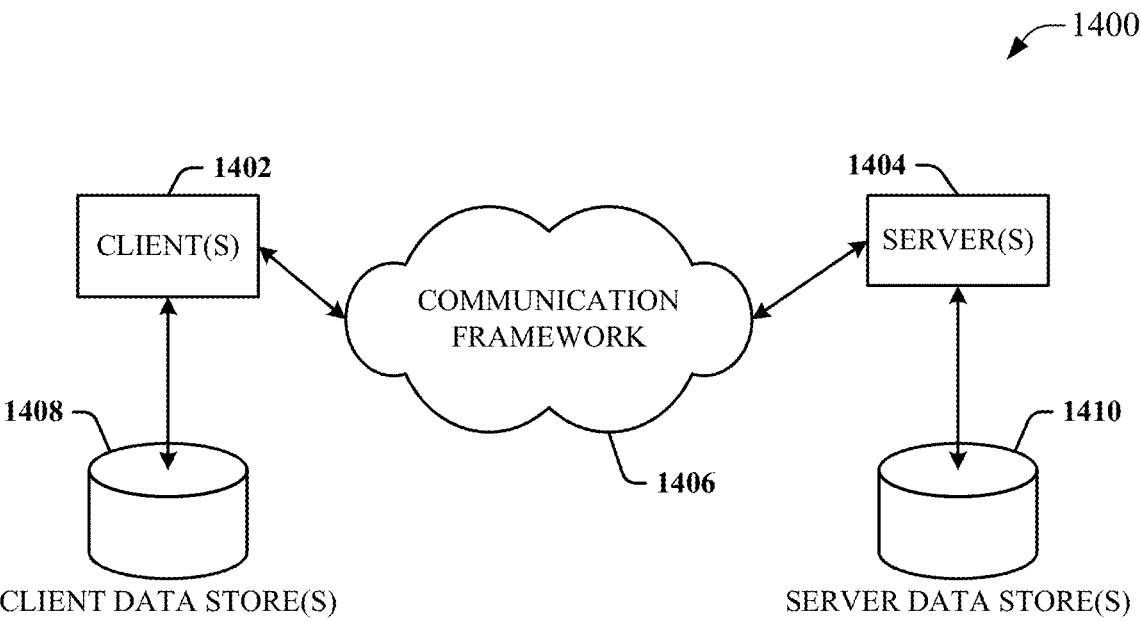
FIG. 14 is an example networking environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13 the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for application programs 1332. Runtime environments are consistent execution environments that allow application programs 1332 to run on any operating system that includes the runtime environment. Similarly, operating system 1330 can support containers, and application programs 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the adapter 1356 in a wireless mode.

When used in a WAN networking environment, the computer 1302 can include a modem 1358 or can be connected to a communications server on the WAN 1354 via other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1352 or WAN 1354 e.g., by the adapter 1356 or modem 1358, respectively. Upon connecting the computer 1302 to an associated cloud storage system, the external storage interface 1326 can, with the aid of the adapter 1356 and/or modem 1358, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 14 is a schematic block diagram of a sample computing environment 1400 with which the disclosed subject matter can interact. The sample computing environment 1400 includes one or more client(s) 1402. The client(s) 1402 can be hardware and/or software (e.g., threads, processes, computing devices). The sample computing environment 1400 also includes one or more server(s) 1404. The server(s) 1404 can also be hardware and/or software (e.g., threads, processes, computing devices). The servers 1404 can house threads to perform transformations by employing one or more embodiments as described herein, for example. One possible communication between a client 1402 and servers 1404 can be in the form of a data packet adapted to be transmitted between two or more computer processes. The sample computing environment 1400 includes a communication framework 1406 that can be employed to facilitate communications between the client(s) 1402 and the server(s) 1404. The client(s) 1402 are operably connected to one or more client data store(s) 1408 that can be employed to store information local to the client(s) 1402. Similarly, the server(s) 1404 are operably connected to one or more server data store(s) 1410 that can be employed to store information local to the servers 1404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for providing industrial control system design guidance, comprising:

a memory that stores executable components; and a processor, operatively coupled to the memory, that executes the executable components, the executable components comprising:

a user interface component configured to render integrated development environment (IDE) interfaces and to receive, via interaction with the IDE interfaces, design input that defines aspects of a control project for monitoring and controlling an industrial system;

a project generation component configured to generate system project data based on the design input, the system project data comprising at least an executable industrial control program and industrial device configuration data;

a project telemetry component configured to generate project telemetry data based on a first analysis of the system project data, the project telemetry data identifying industrial devices used by the control project and features of the industrial devices used by the control project; and a project analysis component configured to, based on a second analysis performed on the project telemetry data:

retrieve, from one or more vendor repositories, digital device profiles corresponding to the industrial devices identified by the project telemetry data, wherein the digital device profiles are generic digital representations of the industrial devices and comprise functional specification data for the industrial devices, the functional specification data comprising at least response times for the industrial devices and available configuration parameters for the industrial devices, and apply the industrial device configuration data obtained from the system project data to the digital device profiles to yield customized asset models representing the industrial devices as configured by the system project data, wherein the customized asset models yield a digital twin capable of simulating the industrial system.

2. The system of claim 1, wherein the project telemetry data further identifies unused available features of the industrial devices, and the project analysis component is further configured to predict whether usage of an unused available feature, of the unused available features, of an industrial device will improve a performance metric of the industrial system, and generate a recommendation to modify the control project to utilize the unused available feature.

3. The system of claim 2, wherein the project analysis component is configured to predict whether the usage of the unused available feature will improve the performance metric based on at least one of a reference to vendor specifications for the industrial device or a comparison of the control project with other control projects for monitoring and controlling industrial systems that are similar to the industrial system.

4. The system of claim 1, wherein the project analysis component is further configured to:

determine, based on a third analysis performed on the project telemetry data, that the control project will cause one of the industrial devices to operate near or above its rated resource capacity, and generate, based on a result of the third analysis, a recommendation to replace the one of the industrial devices with a replacement industrial device having a greater resource capacity than the one of the industrial devices.

5. The system of claim 4, wherein the rated resource capacity is at least one of a memory capacity, a processing capacity, or an I/O capacity.

6. The system of claim 1, wherein the project analysis component is further configured to generate, based on a third analysis performed on the project telemetry data, usage statistics for a subset of the industrial devices that are specific to an equipment vendor, and to render the usage statistics accessible to the equipment vendor.

7. The system of claim 6, wherein the usage statistics comprise at least one of an indication of which of the equipment vendor's products are being used by the control project, which features of the equipment vendor's products are used by the control project, and an indication of used resource capacity for the equipment vendor's products.

8. The system of claim 1, wherein the project analysis component is further configured to generate, based on a third analysis performed on the project telemetry data, usage statistics for the industrial devices, the usage statistics comprising at least one of identities of the industrial devices used by the control project, the features of the industrial devices used by the control project, unused available features of the industrial devices, or resource utilizations of the industrial devices by the control project, and the executable components further comprise a collaboration management component configured to send the usage statistics to a technical support entity.

9. The system of claim 8, wherein the collaboration management component is further configured to send the usage statistics together with error frequency data indicating a frequency of operational errors of the industrial system.

10. A method for providing industrial control system design guidance, comprising:

rendering, by a system comprising a processor, integrated development environment (IDE) interfaces on a client device;

receiving, by the system via interaction with the IDE interfaces, industrial design input received from the client device that defines aspects of a control project for monitoring and controlling an industrial system;

generating, by the system, system project data based on the industrial design input, the system project data comprising at least an executable industrial control program and industrial device configuration data;

generating, by the system, project telemetry data based on a first analysis of the system project data, the project telemetry data identifying industrial devices used by the control project and features of the industrial devices used by the control project;

retrieving, by the system based on a second analysis performed on the project telemetry data, digital device profiles corresponding to the industrial devices identified by the project telemetry data from one or more vendor repositories, wherein the digital device profiles are generic digital representations of the industrial devices and comprise functional specification data for the industrial devices, the functional specification data comprising at least response times for the industrial devices and available configuration parameters for the industrial devices; and converting, by the system, the digital device profiles to customized asset models representing the industrial devices as configured by the system project data, wherein the customized asset models yield a digital twin capable of simulating the industrial system, and the converting comprises applying the industrial device configuration data obtained from the system project data to the digital device profiles to yield the customized asset models.

11. The method of claim 10, wherein the project telemetry data further identifies unused available features of the industrial devices, and the method further comprises:

determining, by the system based on a third analysis performed on the project telemetry data, whether usage of an unused available feature, of the unused available features, of an industrial device will improve a performance metric of the industrial system; and generating, by the system based on a result of the third analysis, a recommendation to modify the control project to utilize the unused available feature.

12. The method of claim 11 wherein the determining comprises determining whether the usage of the unused available feature will improve the performance metric based on at least one of a reference to vendor specifications for the industrial device or a comparison of the control project with other control projects for monitoring and controlling industrial systems that are similar to the industrial system.

13. The method of claim 10, further comprising:

determining, by the system based on a third analysis performed on the project telemetry data, that the control project will cause one of the industrial devices to operate near or above its rated resource capacity, and generating, by the system based on a result of the third analysis, a recommendation to replace the one of the industrial devices with a replacement industrial device having a greater resource capacity than the one of the industrial devices.

14. The method of claim 13, wherein the rated resource capacity is at least one of a memory capacity, a processing capacity, or an I/O capacity.

15. The method of claim 10, further comprising:

generating, by the system based on a third analysis performed on the project telemetry data, usage statistics for a subset of the industrial devices that are specific to an equipment vendor, and rendering, by the system, the usage statistics accessible to the equipment vendor.

16. The method of claim 15, wherein the usage statistics comprise at least one of an indication of which of the equipment vendor's products are being used by the control project, which features of the equipment vendor's products are used by the control project, and an indication of used resource capacity for the equipment vendor's products.

17. The method of claim 10, further comprising:

generating, by the system based on a third analysis performed on the project telemetry data, usage statistics for the industrial devices, the usage statistics comprising at least one of identities of the industrial devices used by the control project, the features of the industrial devices used by the control project, unused available features of the industrial devices, or resource utilizations of the industrial devices by the control project, and sending, by the system, the usage statistics to a technical support entity.

18. The method of claim 17, wherein the sending comprises sending the usage statistics to the technical support entity together with error frequency data indicating a frequency of operational errors of the industrial system.

19. A non-transitory computer-readable medium having stored thereon instructions that, in response to execution, cause a system comprising a processor to perform operations, the operations comprising:

rendering integrated development environment (IDE) interfaces on a client device;

receiving, via interaction with the IDE interfaces, industrial design input received from the client device that defines aspects of a control project for monitoring and controlling an industrial system;

generating system project data based on the industrial design input, the system project data comprising at least an executable industrial control program and industrial device configuration data;

generating project telemetry data based on a first analysis of the system project data, the project telemetry data identifying industrial devices used by the control project and features of the industrial devices used by the control project;

retrieving, based on a second analysis performed on the project telemetry data, digital device profiles corresponding to the industrial devices identified by the project telemetry data from one or more vendor repositories, wherein the digital device profiles are generic digital representations of the industrial devices and comprise functional specification data for the industrial devices, the functional specification data comprising at least response times for the industrial devices and available configuration parameters for the industrial devices; and applying the industrial device configuration data obtained from the system project data to the digital device profiles to yield customized asset models representing the industrial devices as configured by the system project data, wherein the customized asset models yield a digital twin capable of simulating the industrial system.

20. The non-transitory computer-readable medium of claim 19, wherein the project telemetry data further identifies unused available features of the industrial devices, and the operations further comprise:

determining, based on a third analysis performed on the project telemetry data, whether usage of an unused available feature, of the unused available features, of an industrial device will improve a performance metric of the industrial system, generating, based on a result of the third analysis, a recommendation to modify the control project to utilize the unused available feature.

* * * * *